US010932421B2

(12) United States Patent
Bowie

(10) Patent No.: US 10,932,421 B2
(45) Date of Patent: Mar. 2, 2021

(54) TREE ROOT PROTECTION PANEL

(71) Applicant: GREENBLUE URBAN LIMITED, Hastings (GB)

(72) Inventor: Dean Bowie, Hastings (GB)

(73) Assignee: GREENBLUE URBAN LTD., Hastings (GB)

( * ) Notice: Subject to any disclaimer, the term of this patent is extended or adjusted under 35 U.S.C. 154(b) by 0 days.

(21) Appl. No.: 15/025,066

(22) PCT Filed: Sep. 26, 2014

(86) PCT No.: PCT/GB2014/052924
§ 371 (c)(1),
(2) Date: Mar. 25, 2016

(87) PCT Pub. No.: WO2015/044676
PCT Pub. Date: Apr. 2, 2015

(65) Prior Publication Data
US 2016/0219798 A1    Aug. 4, 2016

(30) Foreign Application Priority Data

Sep. 27, 2013    (GB) .................................... 1317174

(51) Int. Cl.
*A01G 13/02*     (2006.01)
*E01C 9/00*      (2006.01)
(52) U.S. Cl.
CPC .......... *A01G 13/0237* (2013.01); *E01C 9/005* (2013.01); *Y02A 30/30* (2018.01)
(58) Field of Classification Search
USPC ........ 405/36, 43–45; 47/32, 32.3, 32.8, 48.5
See application file for complete search history.

(56) References Cited

U.S. PATENT DOCUMENTS

| 3,253,377 | A | * | 5/1966 | Schakel | ............... | B62D 33/046 |
| | | | | | | 52/592.4 |
| 3,784,043 | A | * | 1/1974 | Presnick | .............. | B65D 88/528 |
| | | | | | | 220/4.28 |
| 5,383,302 | A | * | 1/1995 | Hill | ..................... | A01G 13/0237 |
| | | | | | | 47/33 |
| 5,810,510 | A | * | 9/1998 | Urriola | ................. | E02B 11/005 |
| | | | | | | 137/236.1 |

(Continued)

FOREIGN PATENT DOCUMENTS

DE          32 02 684 A1    8/1983
DE     10 2011 084022 B3    3/2013

(Continued)

OTHER PUBLICATIONS

International Search Report and Written Opinion for PCT/GB2014/052924, dated Dec. 9, 2014.

*Primary Examiner* — Sean D Andrish
(74) *Attorney, Agent, or Firm* — William H. Honaker; Dickinson Wright PLLC

(57) ABSTRACT

A modular anti-soil-compaction apparatus, comprising a matrix of substantially flat, modular panels (100), each panel (100) comprising two opposing faces surrounded by edges, at least one aperture (104,105) passing through the faces, and modular panel connection means located on at least one pair of edges; each panel (100) being engageable with at least one adjacent panel (100) by respective connection means.

16 Claims, 22 Drawing Sheets

(56) References Cited

U.S. PATENT DOCUMENTS

| | | | | |
|---|---|---|---|---|
| 5,967,701 | A * | 10/1999 | Berkley | ............... E02D 5/03 |
| | | | | 405/274 |
| 6,695,534 | B2 * | 2/2004 | Cain | ............... B65D 90/24 |
| | | | | 405/114 |
| 7,677,835 | B2 * | 3/2010 | Oscar | ............... B65D 88/022 |
| | | | | 405/36 |
| 2005/0155285 | A1 | 7/2005 | Urban et al. | |
| 2008/0166182 | A1 * | 7/2008 | Smith | ............... E03F 1/005 |
| | | | | 405/36 |

FOREIGN PATENT DOCUMENTS

| | | |
|---|---|---|
| FR | 2547561 | 12/1984 |
| GB | 2438817 | 12/2007 |
| WO | 2008/030238 A1 | 3/2008 |
| WO | 20110147766 | 2/2011 |

* cited by examiner

TREE ROOT PROTECTION PANEL

CROSS REFERENCE TO RELATED APPLICATIONS

This application is a national phase application pursuant to 35 U.S.C. 371 of International Application No. PCT/GB2014/052924, filed Sep. 26, 2014, which claims priority to United. Kingdom Application No 1317174.9, filed Sep. 27, 2013. These applications are hereby incorporated by reference in their entireties.

FIELD OF THE INVENTION

The field of the invention is structures for the protection of urban trees and more particularly structures for the prevention of soil compaction around their roots.

BACKGROUND

Trees need un-compacted soil to grow to their potential in urban spaces. Trees in nature have access to large volumes of soil, within the top 600 mm of surface levels, usually but not always, all around the tree.

Trees in towns and cities however have to compete for space below ground with services and utilities and access to un-compacted soil volumes is almost non-existent. Tragically nearly 50% of trees planted in urban areas do not reach maturity. Typically a tree will require in excess of five cubic meters of soil, and up to fifty cubic meters for a large tree, to reach maturity and bring the benefits that bigger trees can bring to cities.

Prior art exists to provide for uncompacted soil volumes or water volumes below ground. Most of these systems, such as those disclosed in GB2438817, WO2011/017766, US2008/0166182 and FR2547561 provide cellular devices, which may be used individually or as a structure comprising multiple cells fitted together. However, this type of cellular device suffers from the problems of being bulky to freight, often very expensive for widespread use, insufficiently strong to carry the weight of vehicles over a sustained period of time, inflexible in the layout arrangements and/or complicated to install. In some cases, such as the structure in WO2011/017766, filling with soil can prove surprisingly difficult. An additional problem is that none of the available systems, make any provision for the fitting of utility pipes or similar conduits through the tree pit at a later date.

The present invention is directed to solving at least some of the problems set out.

SUMMARY OF THE INVENTION

In a first aspect of the present invention, there is provided a modular anti-soil-compaction apparatus, comprising; a matrix of substantially flat, modular panels, each panel comprising; two opposing faces surrounded by edges, at least one aperture passing through said faces, and modular panel connection means located on at least one pair of edges, each panel being engaged with at least one adjacent panel by respective connection means.

Preferably the modular panel connection means are located on at least two opposing upright edges.

Preferably the modular panels are directly connected to one another in the matrix.

Preferably the modular panels are connected by hermaphrodite connectors.

Preferably the modular anti-soil-compaction apparatus further comprises connection pillars for engagement with said connection means of adjacent modular panels.

Optionally, the base of said modular panel matrix is rectangular.

Optionally the base of said modular panel matrix is hexagonal.

Preferably individual modular panels are differentiated by colour-coding or integrated text.

Preferably, the modular anti-soil-compaction apparatus further comprises a top-side panel positioned across the top of at least part of the modular panel matrix.

Preferably the modular panels are substantially rectangular.

In another aspect of the invention there is provided a modular anti-soil-compaction apparatus, comprising, a substantially flat panel having a pair of opposed faces surrounded by at least two pairs of opposed edges, and at least one aperture passing through said faces, wherein each of at least one pair of opposed edges comprise connection means for creating a matrix of interconnecting panels.

In another aspect of the invention, there is provided a kit of parts for constructing the modular anti-soil-compaction apparatus according to any of the preceding claims.

BRIEF DESCRIPTION OF THE FIGURES

The above and other aspects of the invention will now be described by way of example only, with reference to the following drawings in which.

DETAILED DESCRIPTION

Figure 1:
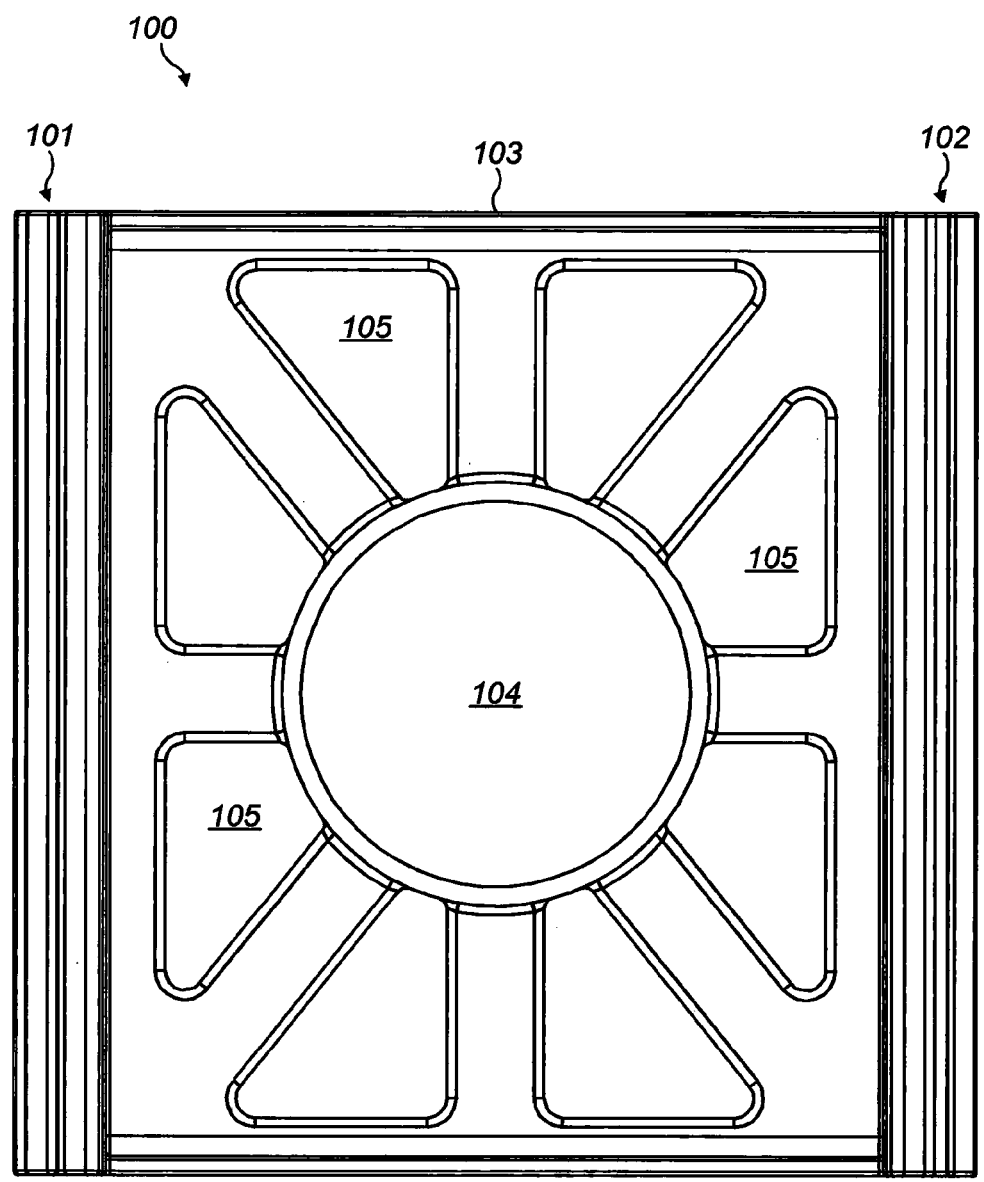
FIG. 1 is a side view of a face of a panel according to an embodiment of the invention.

FIG. 1 is a side view of a panel 100 according to an embodiment of the invention. Panel 100 comprises two pillars 101, 102 substantially parallel to each other and on opposite sides of and integral with a main central section 103, which comprises a plurality of apertures. In a preferred embodiment, there is provided a circular central aperture 104 and a plurality of smaller peripheral apertures 105. This arrangement allows roots of a tree to pass through any of the apertures, but provides a larger aperture for the location of utility pipes.

Figure 2:
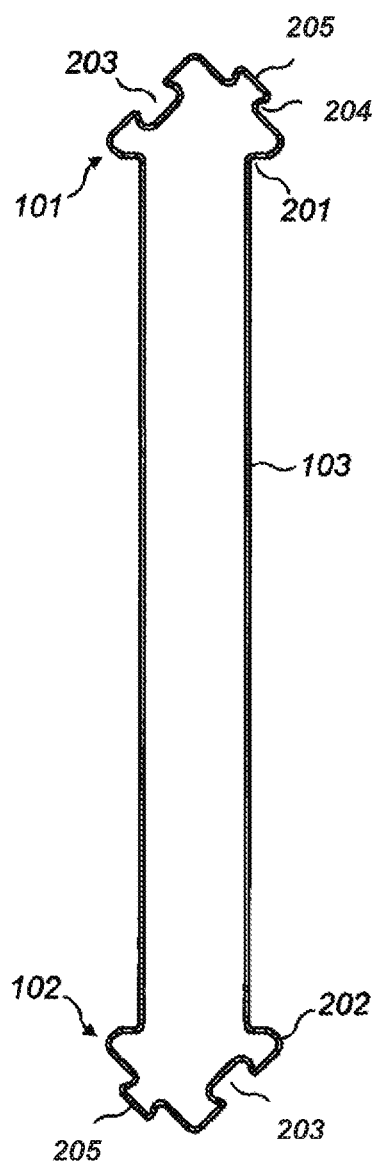
FIG. 2 is a top view of the panel of FIG. 1.

Each of the pillars 101, 102 comprises at least one recess and one protrusion (not shown in detail) running longitudinally along the length of the pillar. This allows for an easy and secure interconnection of the panels, without the need for additional securing mechanisms. FIG. 2 includes a top view of a panel according to an embodiment of the invention, showing central section 103 and pillars 101, 102. In the embodiment shown, each pillar 101, 102 has substantially a substantially triangular cross-section with a first side 201 abutting the main section of the panel, a second side 202 including a recess 203 and a third side 204 including a protrusion 205. Recess 203 and protrusion 205 are shaped such that protrusion 205 fits into recess 203. This is referred to as a hermaphrodite joint.

Figure 3:
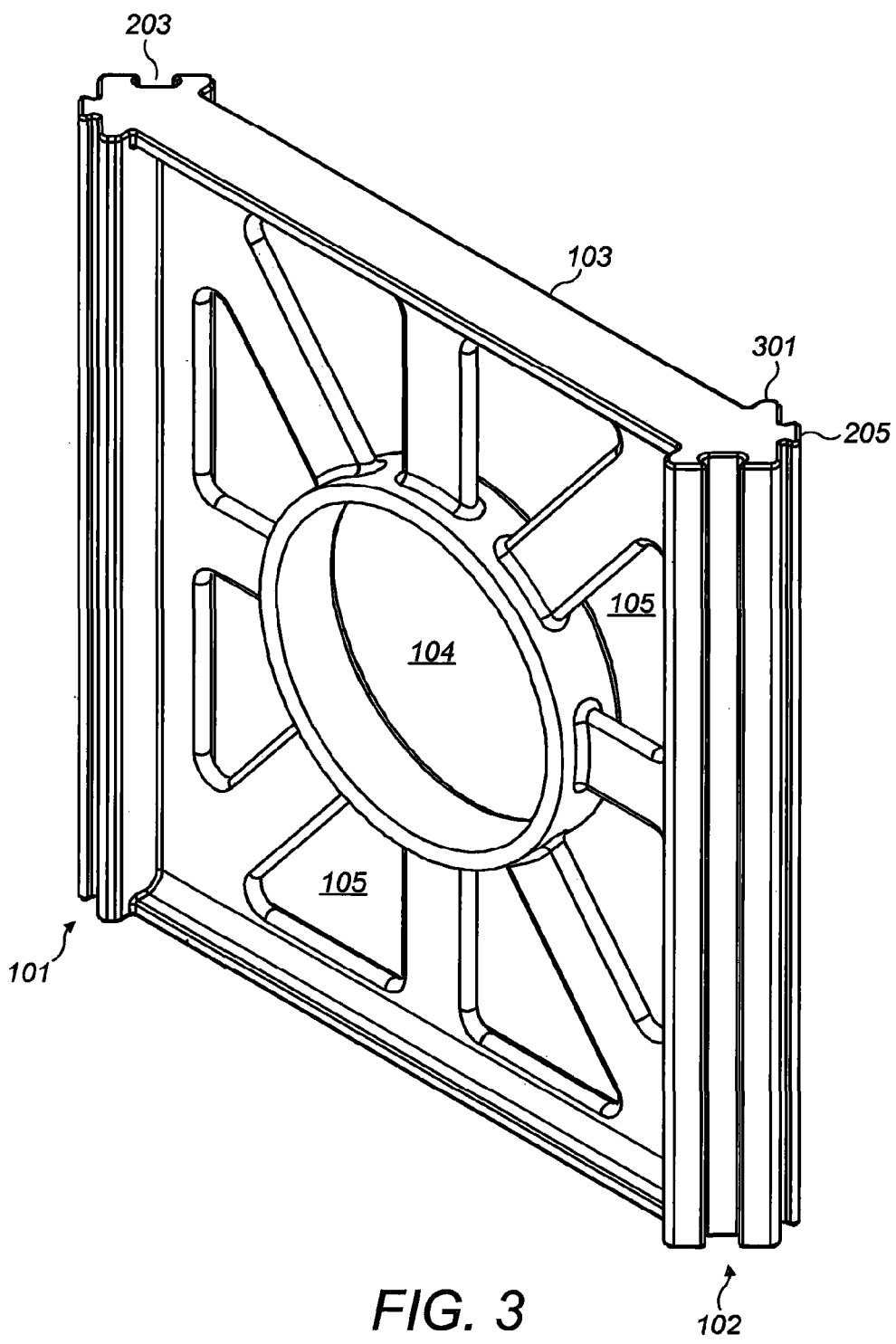
FIG. 3 is a perspective view of the panel of FIG. 1.
Figure 4:
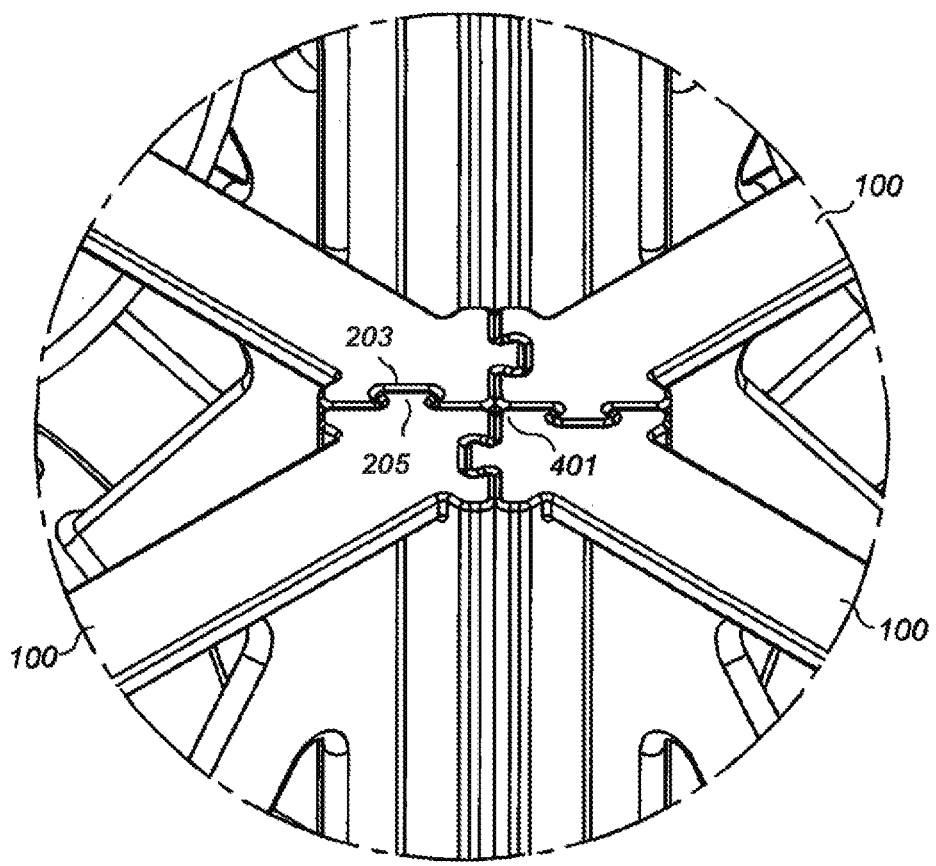
FIG. 4 is a perspective view showing the connection means, joining panels together, according to an embodiment of the invention.

FIG. 3 is a perspective view of a panel according to an embodiment of the invention and illustrates recess 203 and protrusion 205 running along the length of pillars 101, 102. This arrangement enables respective panels to be connected together. In particular, a protrusion 205 of pillar 102 of a panel 100 may be inserted into an end 301 of a recess 203 in a pillar of an adjacent panel, the panels being moved relative each other until the protrusion 205 substantially fills recess 203. The resulting join from such an action is illustrated in FIG. 4, which shows the interlinking of two sets of four panels 100 by means of protrusions 205 and recesses 203 to form secure joint 401.

The embodiment of FIGS. 1 to 4 provides for a single recess and a single protrusion on each pillar. This is however, not the only arrangement that is possible to produce a hermaphrodite joint of this type. Multiple protrusions and recesses may be used on both second side 202 and third side 204. A combination of recesses and protrusions on second side 202 and third side 204 may be used. The person skilled in the art will recognise that there are a very large number of arrangements which may be used to produce a suitable joint and the invention is not limited to any one joint arrangement.

Figure 5:
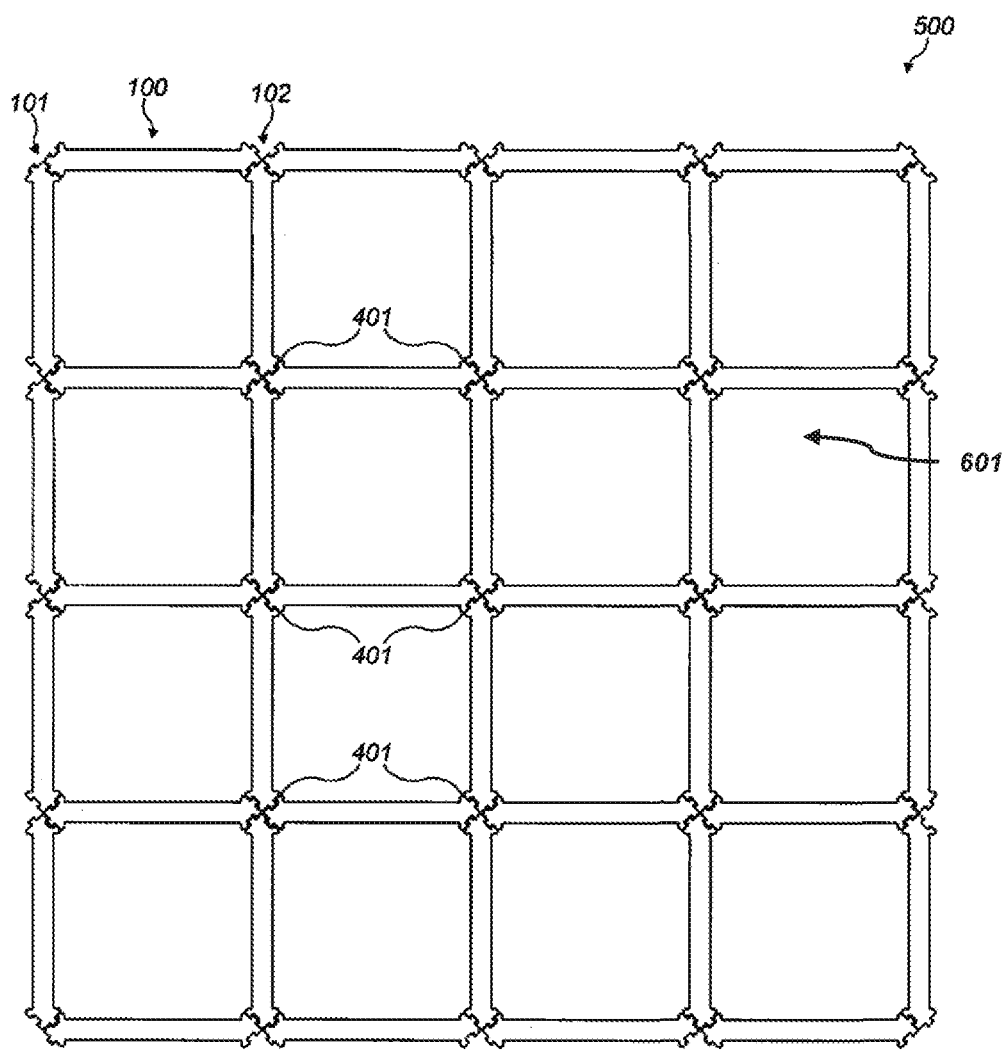
FIG. 5 is a plan view of an anti-soil-compaction apparatus constructed from panels according to an embodiment of the invention.
Figure 6:
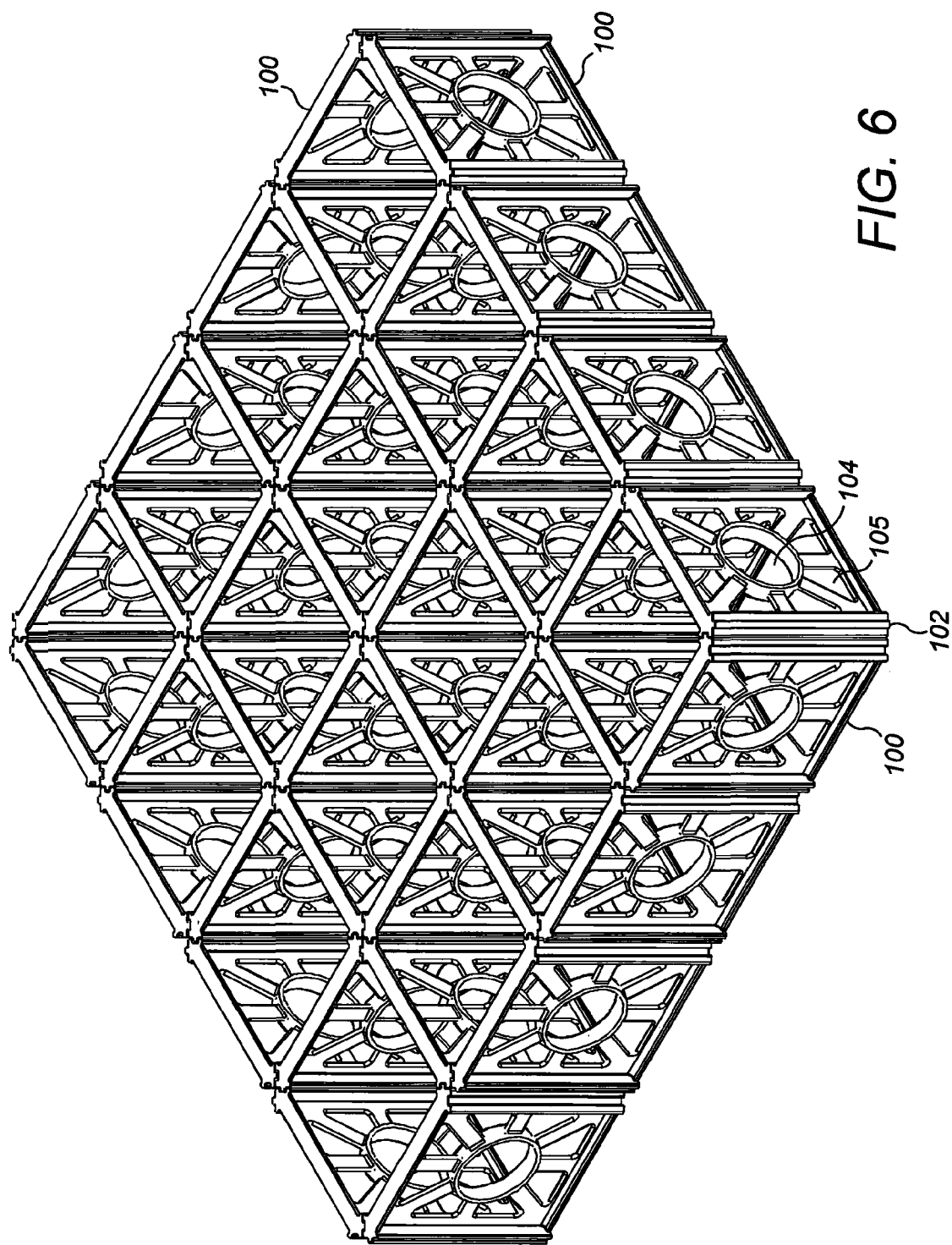
FIG. 6 is a perspective view of the anti-soil-compaction apparatus of FIG. 5.

A plurality of panels may be locked together to form an array structure for providing support for surface objects and preventing the compaction of soil. A plan view of such an array is shown in FIG. 5. A plurality of panels 100 inter-linked by means of secure joints 401 form array 500. A perspective view of such an array is shown in FIG. 6. Panels 100 provide support for surface objects, such as a road surface carrying traffic. Voids 601 between panels 100 allow space for soil to reside without being compacted by pressure from surface objects.

An advantage of the present arrangement is that it provides a modular panel capable of being inter-located with other similar panels to create an open and economical structure, capable of carrying heavy loads such as would be exerted by vehicular overrun in a car park. The panel system is quick, simple and intuitive to install, and efficient to freight. The accepted view that panel systems lack the strength to cope with the heavy loads put upon them by traffic etc. on the surface and/or that they are too complex to economically install. The panels of the present invention, incorporating the simple joint system, assists in solving both problems, by providing a simple and strong mechanism to connect panels together to form a matrix.

Figure 7:
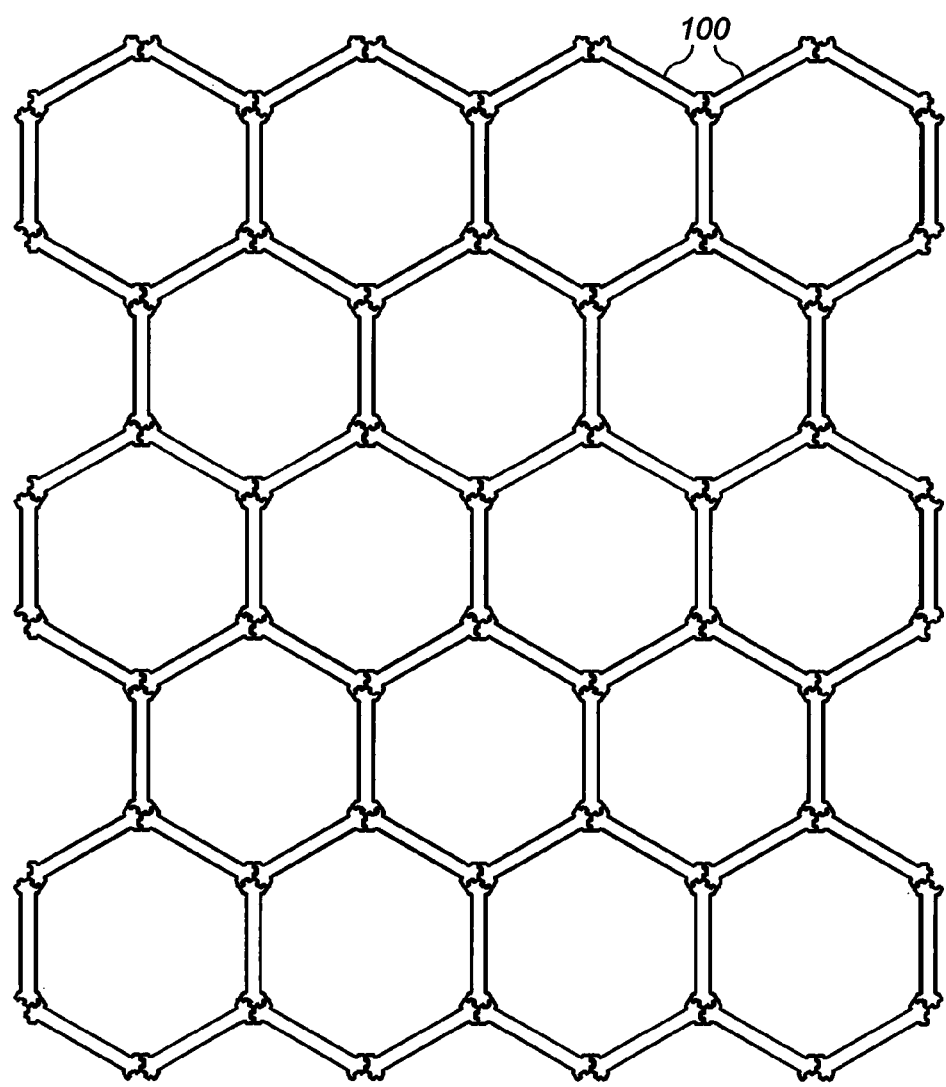
FIG. 7 is a plan view of anti-soil-compaction apparatus according to another embodiment of the invention.
Figure 8:
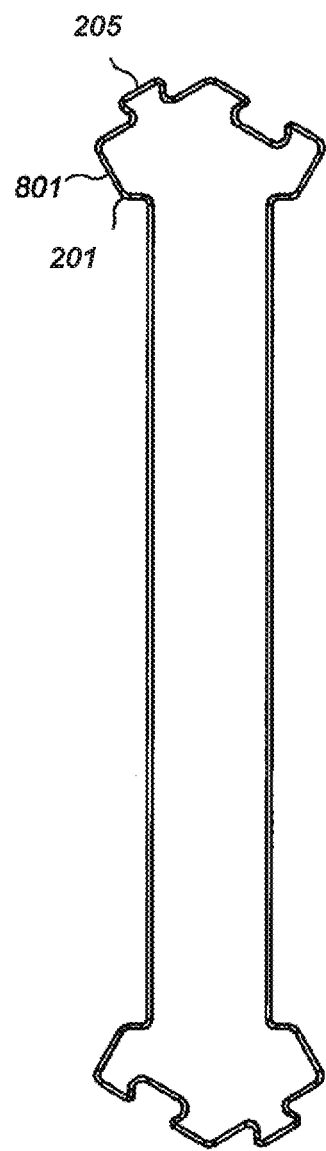
FIG. 8 is a top view of a panel according to the embodiment of FIG. 7.
Figure 9:
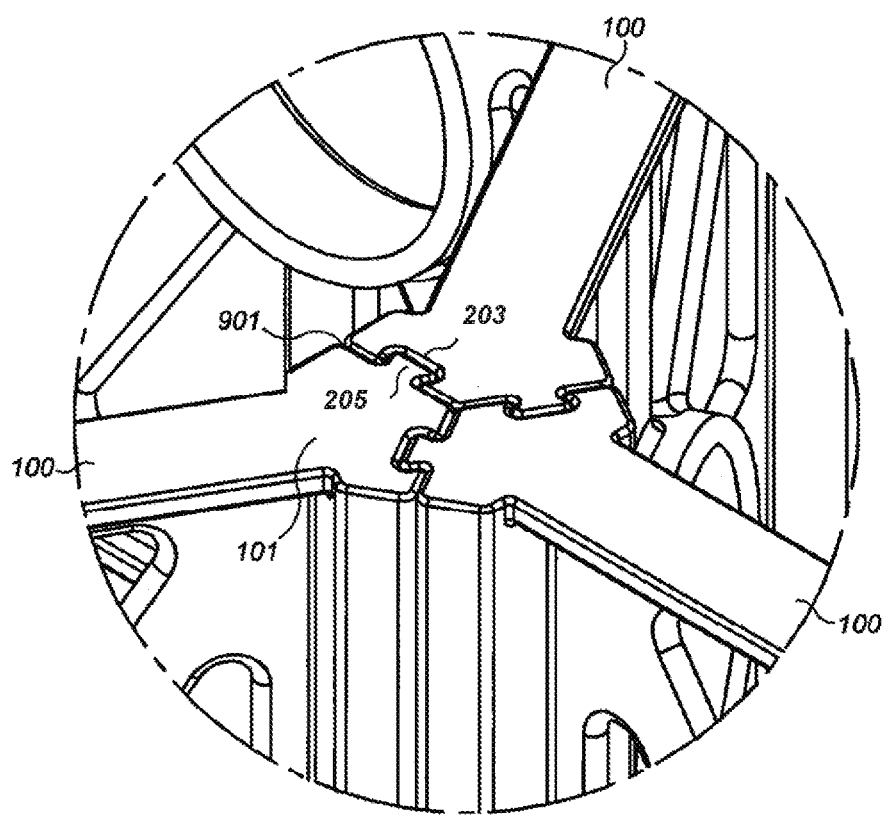
FIG. 9 is a perspective view showing the joining mechanism between panels according to the embodiment of FIG. 8.
Figure 10:
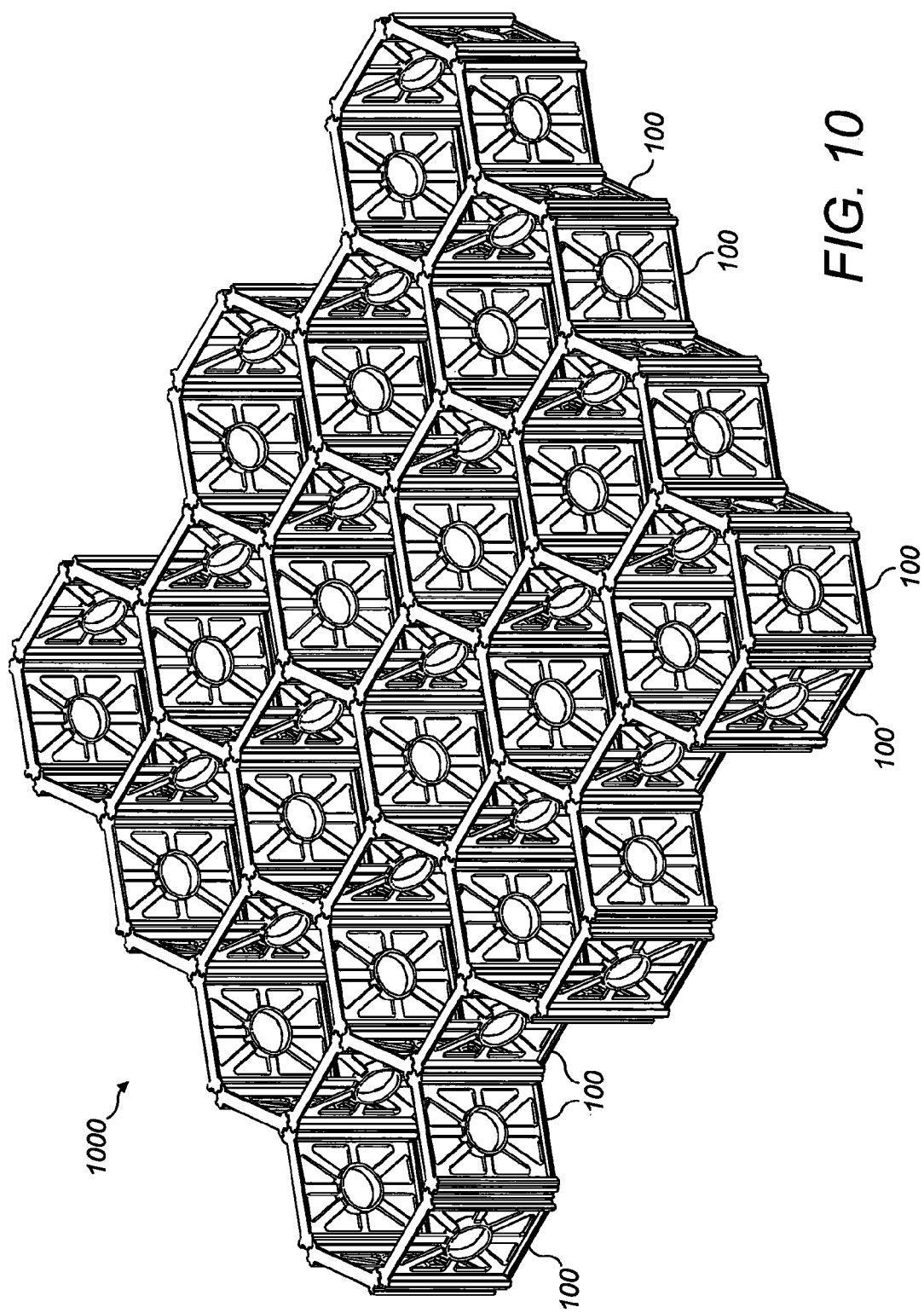
FIG. 10 is a perspective view of an anti-soil-compaction apparatus constructed from panels according to the embodiment of FIG. 9.

The embodiment illustrated in FIGS. 1 to 6 provides for a substantially cuboid void. The person skilled in the art will appreciate that other shapes may be appropriate, for example the use of substantially hexagonal cells. A plan view of such an arrangement is given in FIG. 7. In order to achieve such an arrangement, the pillar arrangement must be changed, as illustrated in FIG. 8. The embodiment of FIG. 8 provides for an angle 801 of 120° between first side 201 and second side 202. This arrangement allows for three panels to interconnect by means of the hermaphrodite joint, rather than four as in the previous embodiment. FIG. 9 is a perspective view of a joint 901 with three panels 100 interconnecting, using the embodiment of FIGS. 7 and 8. As with the previous embodiment, the arrangement shown has one recess 203 and one protrusion 205 on each pillar 101. A matrix of hexagonal cells 1000 constructed using panels 100 according to the embodiment of FIG. 7-9 is shown in FIG. 10. The person skilled in the art will appreciate that the variations in this arrangement described for the embodiment of FIGS. 1 to 6 is equally applicable to the alternative embodiment illustrated in FIGS. 7 to 10 and the invention is not limited to any one arrangement of recesses and protrusions.

Figure 11:
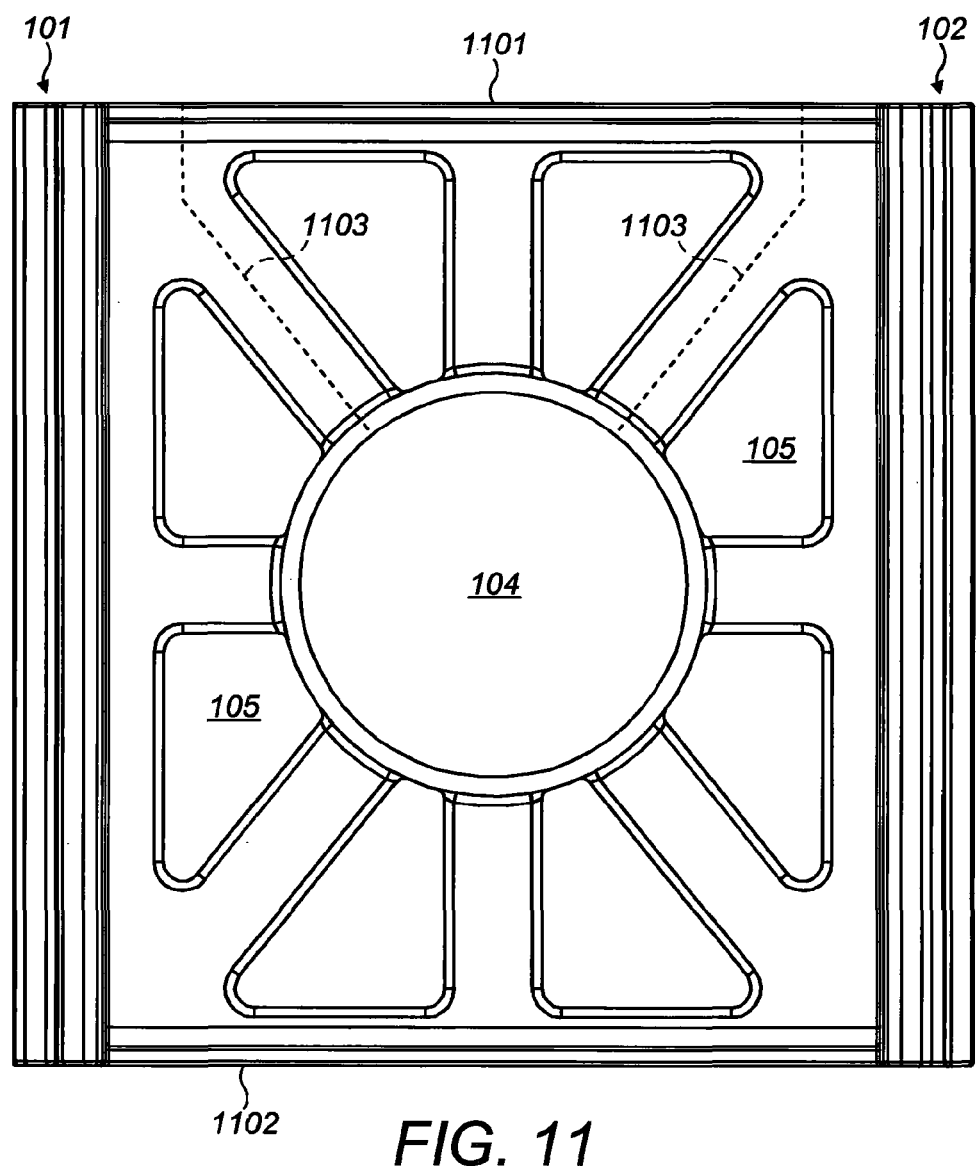
FIG. 11 is a side view of a panel according to yet another embodiment of the invention.

The structures which make up the barriers of tree pits can impose major problem on utility companies and similar service providers. Once structures such as those disclosed in prior art documents such as WO2011/017766 are in place, subterranean pipes may only be installed by removing or damaging the structure of the tree pit, which could prove expensive and potentially detrimental to the health of the tree. Accordingly, another aspect of the invention provides for future laying of pipes or similar conduits through such structures by providing access segments in the panels. FIG. 11 is a side view of a panel according to an embodiment of the invention, which comprises a removable section 1101, located between pillars 101, 102. Removable section 1101 may be separated from the main body 1102 of panel 100, along joining lines 1103. This allows the placing of a pipe or similar structure into aperture 104, without disturbance of the rest of the panel. Consequently pipes or similar structures may be laid without damage to or disruption of an array of panels which forms a soil compaction prevention system.

The lack of disruption of the soil compaction prevention systems means that trees located within the system are likewise not subject to disruption to their roots which may be detrimental or even fatal to their health. The removable panel sections additionally assist in maintaining the strength of the panel sections and overcome the prior art problem of the weakening of tree pit structures which may occur if apertures are cut to provide for utility conduits.

Figure 12:
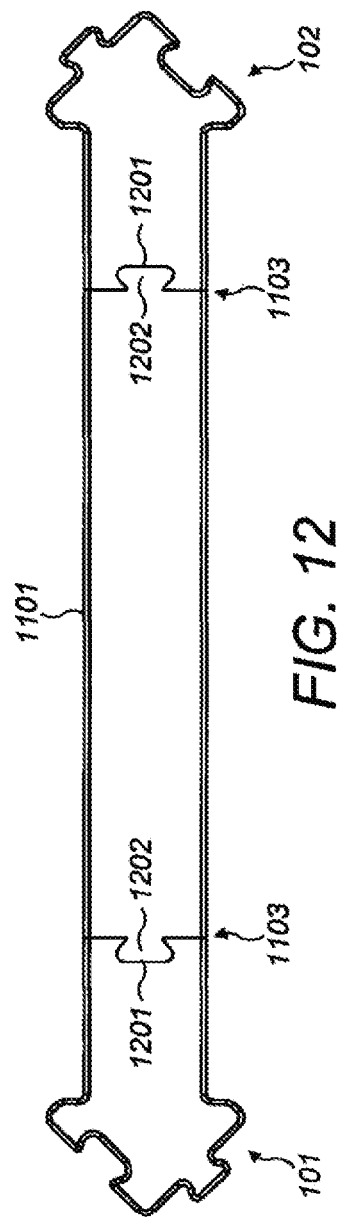
FIG. 12 is a top view of a panel according to the embodiment of FIG. 11.

FIG. 12 is a top view of a panel with removable section 1101. Recesses 1201 are provided in main body 1102 with corresponding protrusions 1202 in removable section 1101. Recesses 1201 are configured to receive protrusions 1202 and hold the removable section 1101 in place within main body 1102. In an embodiment, removable section 1101 and protrusions 1102 extend the length of join line 1103, but the person skilled in the art will recognise that it is not necessary to extend them the full length. Likewise, the skilled person will recognise that the same alternatives for recesses and protrusions are available here as for the recesses and protrusions linking the pillars. The invention is not limited to any one linking arrangement between removable section 1101 and main section 1102.

Figure 13:
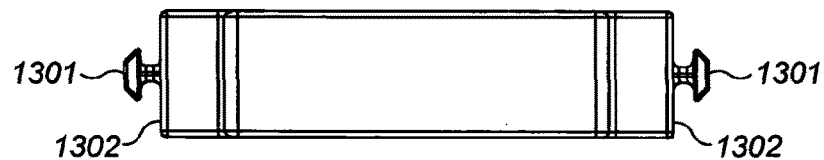
FIG. 13 is a top view of a panel according to yet another the embodiment of the invention.
Figure 14:
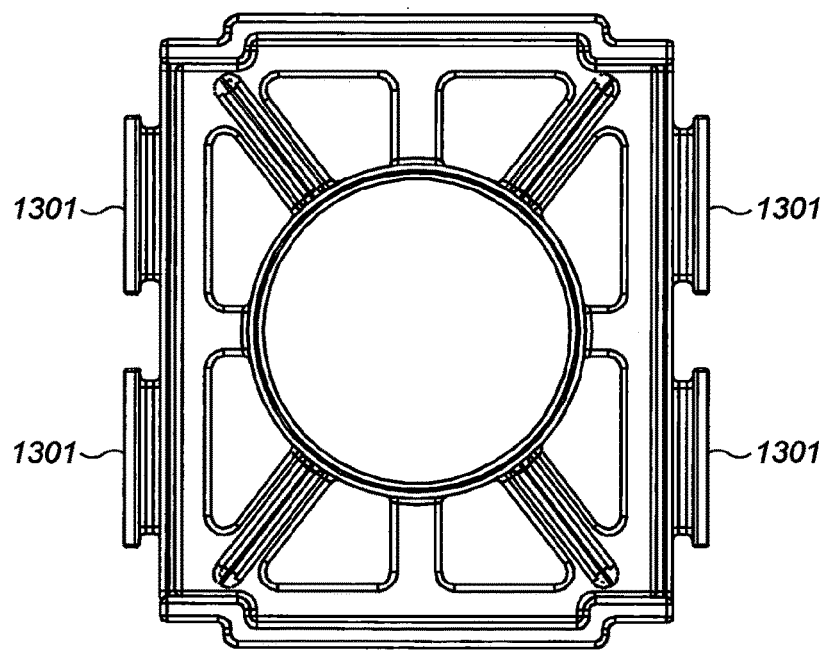
FIG. 14 is a side view of a panel according to the embodiment of FIG. 13.
Figure 15:
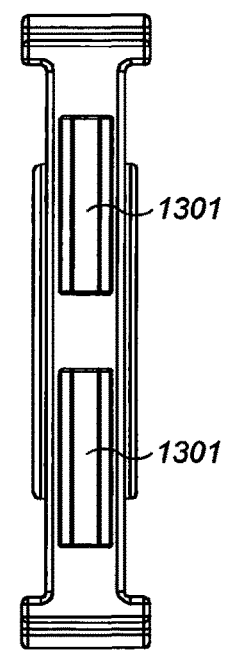
FIG. 15 is a end view of a panel according to the embodiment of FIG. 13.
Figure 16:
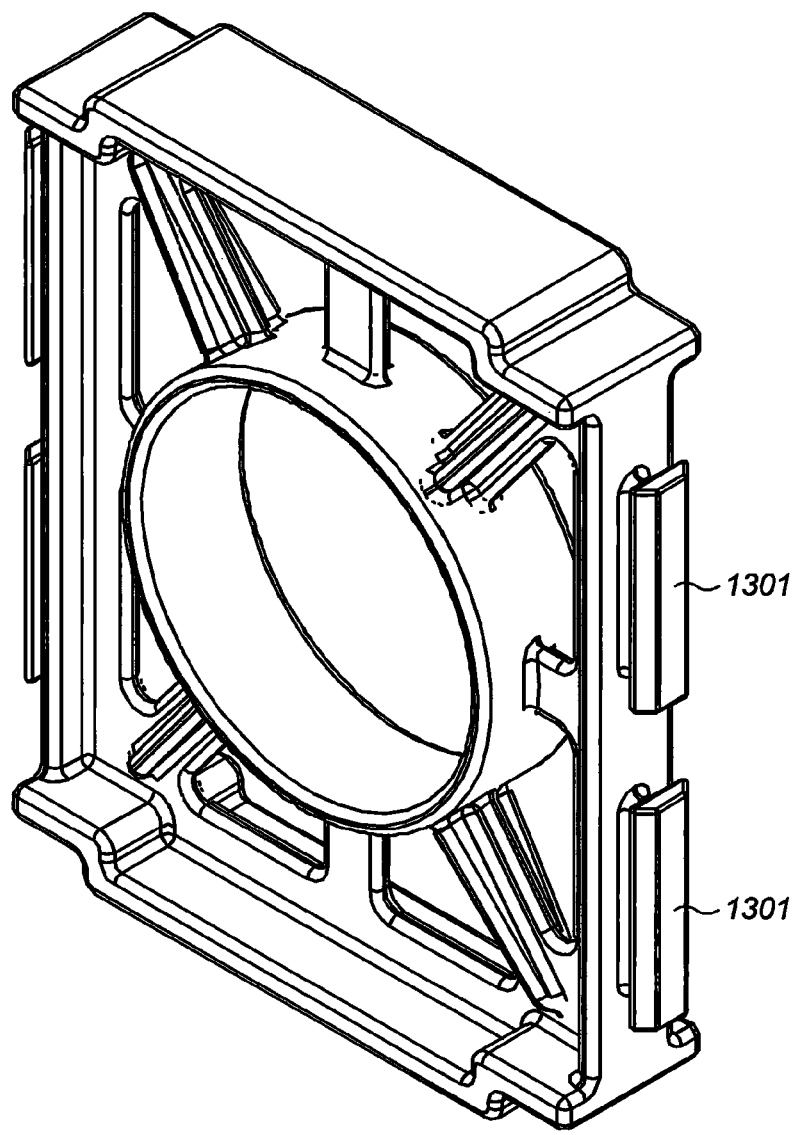
FIG. 16 is a perspective view of a panel according to the embodiment of FIG. 13.

In yet another embodiment of the invention, the connections between the panels are constructed by means of a separate pillar section. In order to construct a joint using a separate pillar section, an alternative panel arrangement is used. FIG. 13 is a top view of this arrangement. Dovetail like protrusions 1301 are provided extending from sides 1302 of panel 100. FIG. 14 is a side view of a panel according to this embodiment of the invention, showing dovetail like protrusions 1301 extending from each side 1302 of panel 100. FIG. 15 is an end view of a panel according to this embodiment and FIG. 16 is a perspective view.

Figure 17:
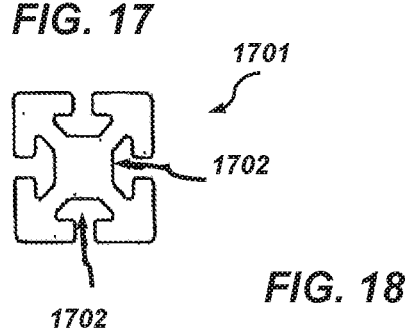
FIG. 17 is a perspective view of a connecting post according to yet another embodiment of the invention.
Figure 18:
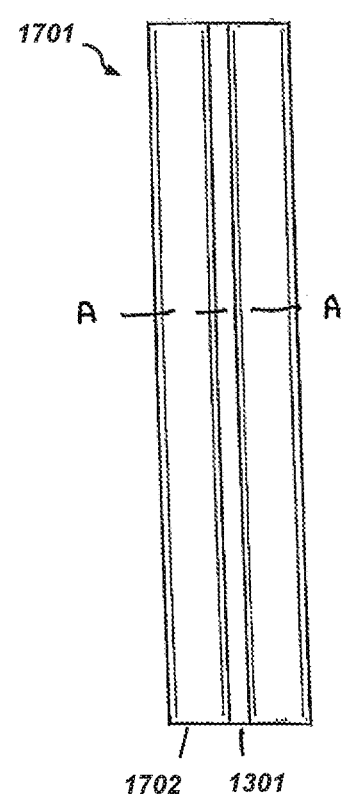
FIG. 18 is a side view of a connecting post according to an embodiment of FIG. 17.
Figure 19:
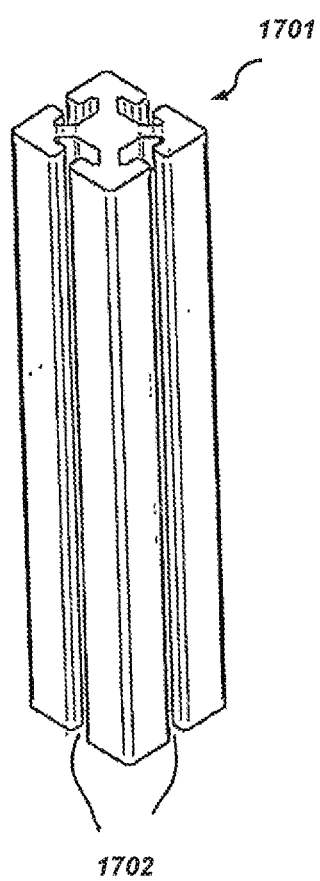
FIG. 19 is a top view of a connecting post according to an embodiment of FIG. 17.
Figure 20:
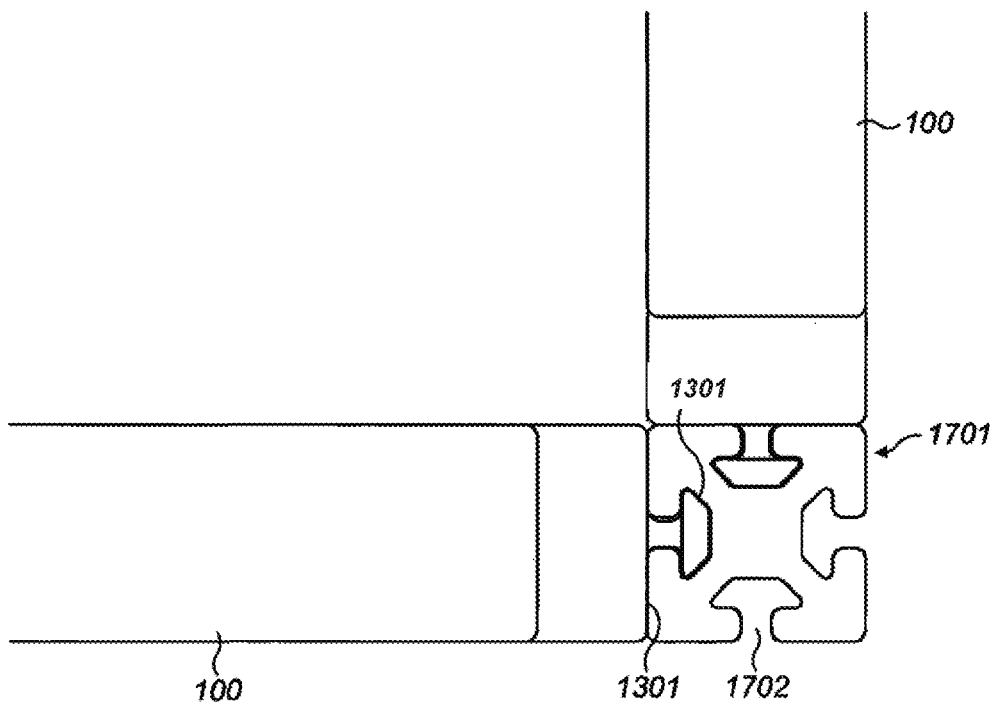
FIG. 20 is a cross-sectional view of panels connected together by means of a connecting post according to the embodiment of FIG. 17.
Figure 21:
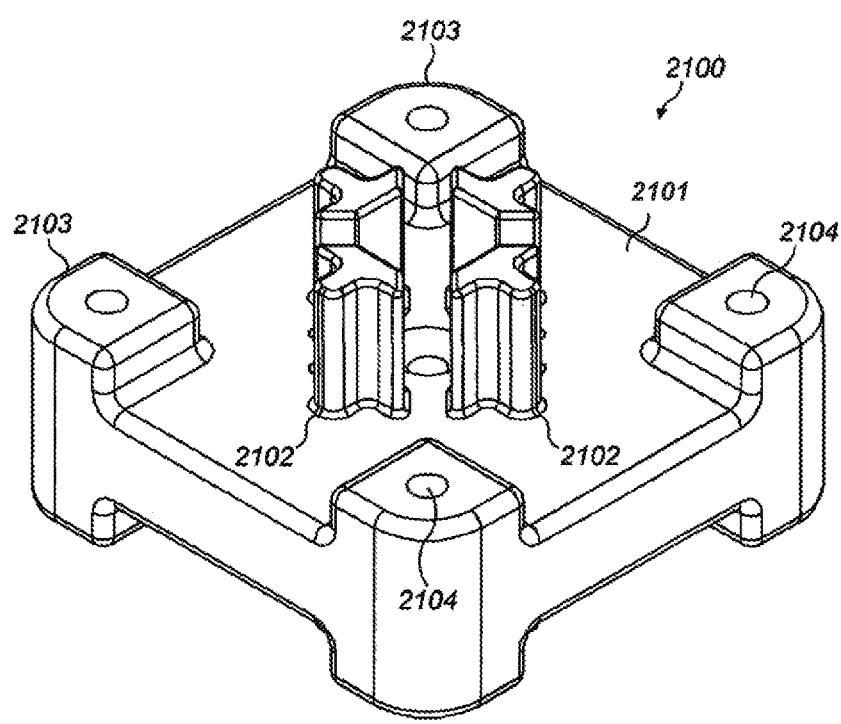
FIG. 21 is a connecting post endplate according to an embodiment of the invention.
Figure 22:
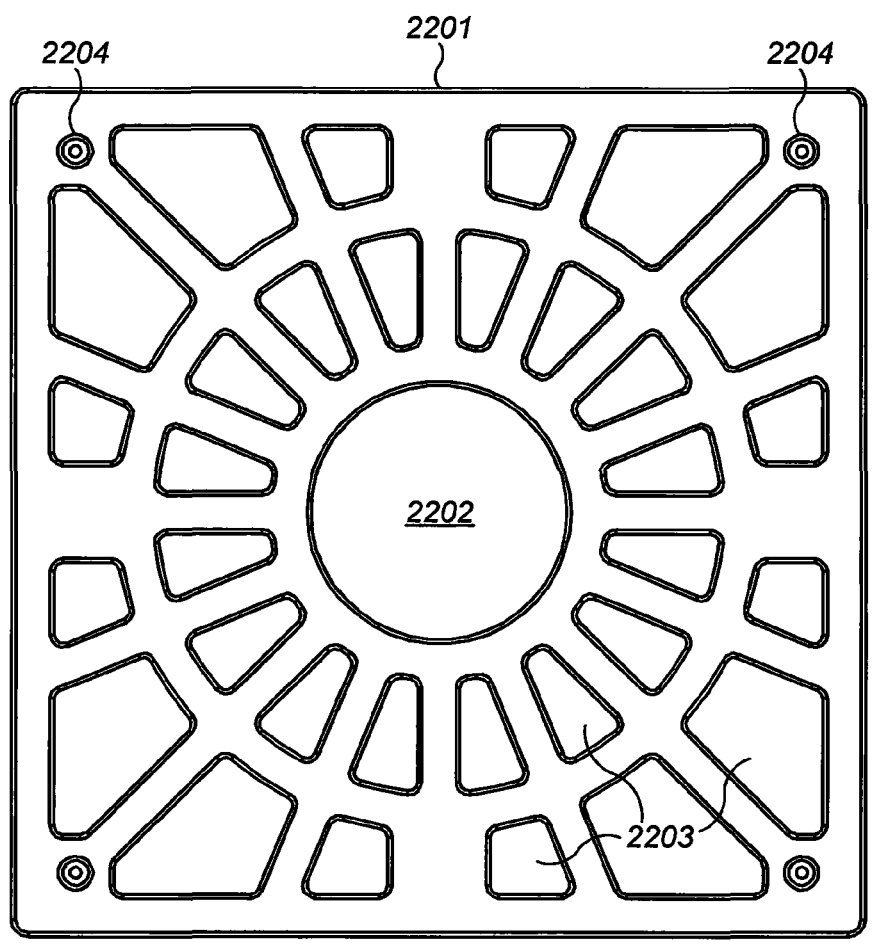
FIG. 22 is a capping tile according to the prior art.

FIG. 17 is a perspective view of a connecting post according to an embodiment of the invention. Connecting post 1701 comprises a plurality of recesses 1702 shaped to receive dovetail protrusions 1301 provided on panels according to an embodiment of the invention. A side view of the connecting post of FIG. 17 is shown in FIG. 18 and a top view in FIG. 19. FIG. 20 is a cross-sectional view, along the line A-A, of panels 100 connected together by means of connecting post 1701. Dovetail protrusions 1301 are inserted into recesses 1702 in a manner similar to the connection action for the previous embodiments. Once the connection between panels and connecting posts has established, it is secured by means of end plates. Endplates according to an embodiment of the invention are illustrated in FIG. 21. Each end plate 2100 comprises support plate 2101, and recess support protrusions 2102, which have a cross-section substantially the same as that of a protrusion on a panel. This enables the insertion of recess support protrusions 2102 into recesses 1702 in connecting post 1701. Raised boss sections 2103 comprising apertures 2104, allow connection with other structures should this prove necessary. For example, such raised boss sections may engage with recesses at end of panels shown in FIG. 16. An example is the use of a conventional capping tile. FIG. 22 is a plan view of such a capping tile 2201, which comprises a central apertures 2202, a plurality of apertures 2203 of varying size and shape to allow water to drain into soil and apertures 2204 to allow securing means such as screws, bolts or spikes for attaching the capping tile to other structures.

Figure 23:
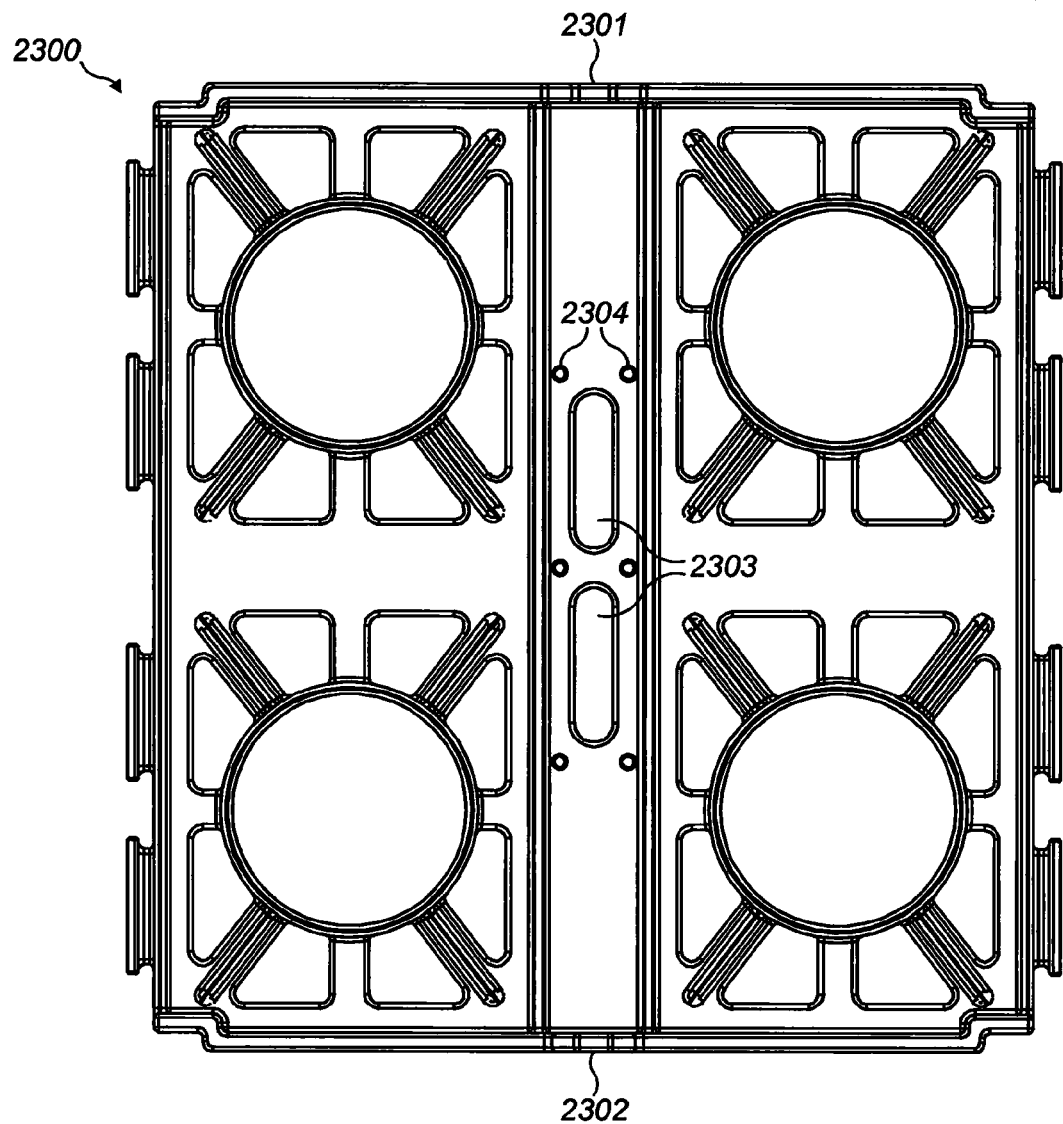
FIG. 23 is a side view of a double sized panel according to an embodiment of the invention.
Figure 24:
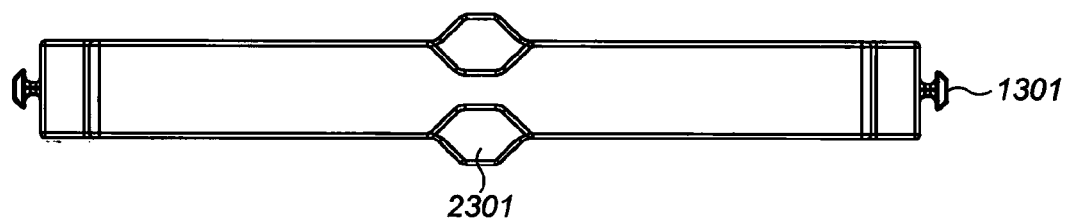
FIG. 24 is a top view of the embodiment of FIG. 23.

In another embodiment of the invention, there is provided a double size panel 2300, illustrated in side view in FIG. 23. This panel has the same features as panels according to previous embodiment, but comprises connection section 2301, which enables the attachment of panels transverse to the double sized panel at a midpoint 2302 of the panel. Elongate slots 2303 are provided to receive dovetail protrusions. In another embodiment, a central connection section is provided, which is configured to receive hermaphrodite connections. The invention is not limited to any one particular linking mechanism for the connection section. The person skilled in the art will appreciate that there are many possible variants are possible, with panels with multiple connection points, providing for many different sizes or shapes of panel. Single sized panels for example can be provided with a connection section 2302 to allow more panel sections to be included and hence increase the strength of a modular system. Colour coding and integral lettering may be used to identify different panel types. FIG. 24 is a top view of this embodiment.

Figure 25:
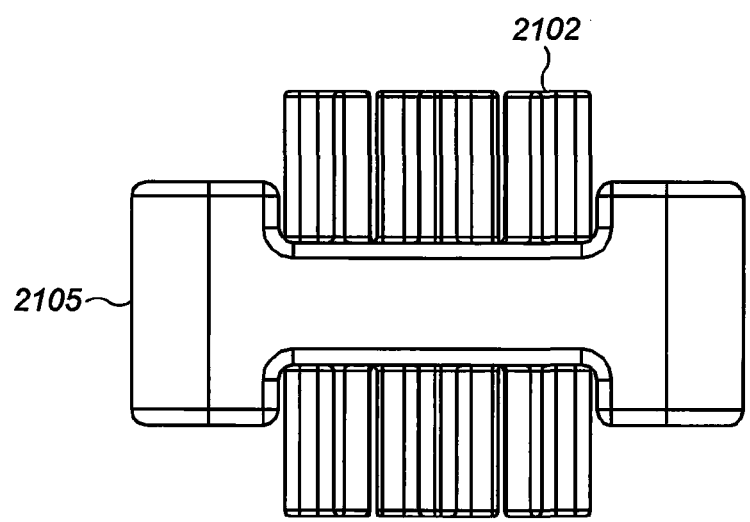
FIG. 25 is a connecting post linking plate according to an embodiment of the invention.

If a tree pit deeper than the standard size of panel is required, then the panels may be stacked. In order to achieve this, a linking mechanism between connecting posts is required. FIG. 25 is a side view of a linking mechanism according to an embodiment of the invention. The linking mechanism comprises a linking plate 2105, which has recesses or a recess support protrusions 2102 on both sides of the plate in order to accommodate connecting posts 1701 both above and below the linking plate.

Figure 26:
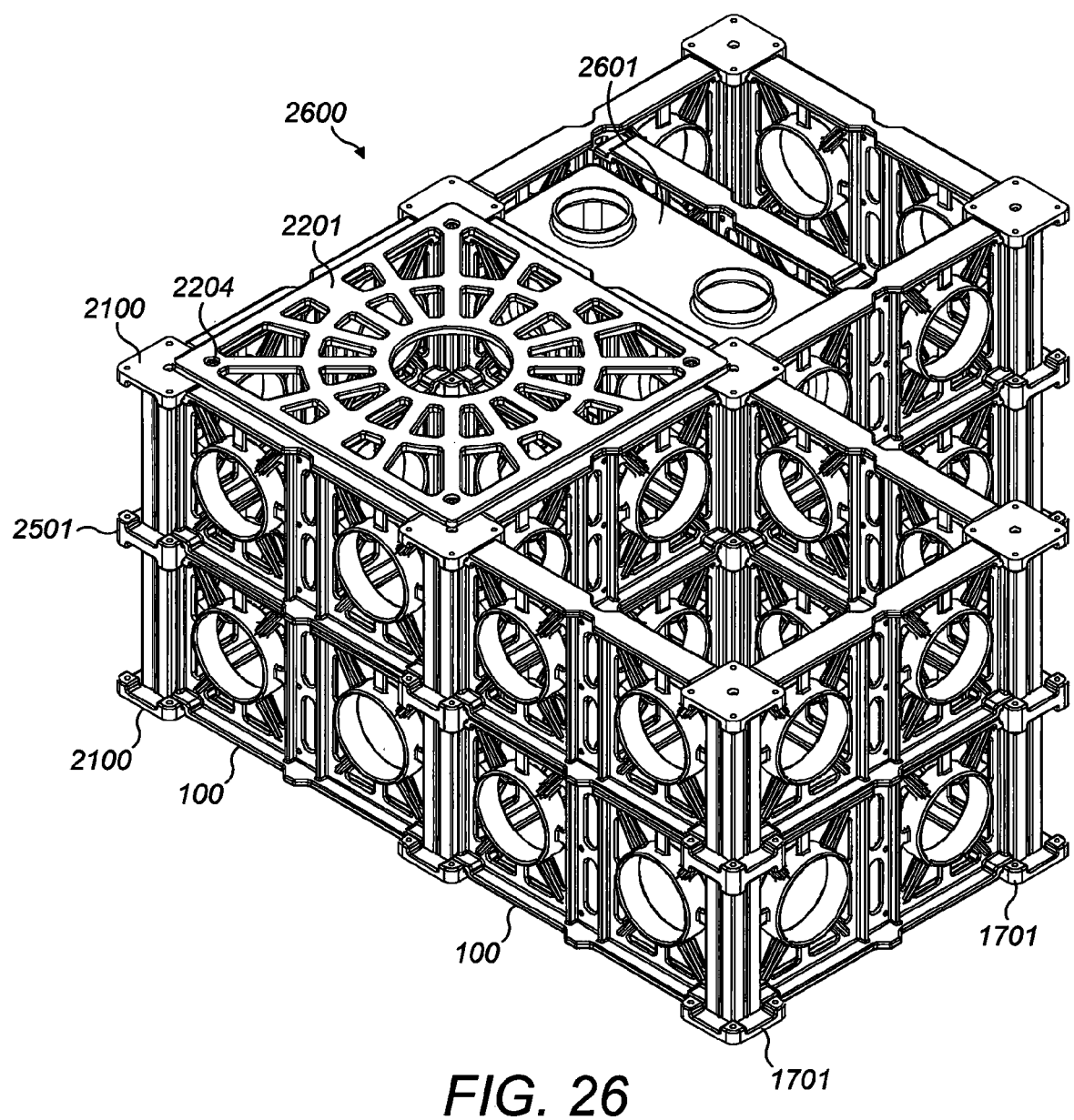
FIG. 26 is a perspective view of part of a typical tree-pit structure according to an embodiment of the invention.

FIG. 26 is a perspective view of part of a typical tree-pit structure according to an embodiment of the invention. A plurality of panel sections 100, connecting posts 1701, end plates 2100 and linking plates 2105 are combined to form a single support structure 2600. A capping tile 2201 is shown, connected to the structure by means of apertures 2204 in end plates 2100. However the person skilled in the art will appreciate that alternative connection mechanisms are possible and the invention is not limited to any one method of fixing capping tiles to the structure. Generally, the panels are arranged so that they define cuboid volumes, with the volumes having a width equal to that of panel width. However, panel sections may be omitted in order to allow the placement of devices such as water storage units 2601.

Figure 27:
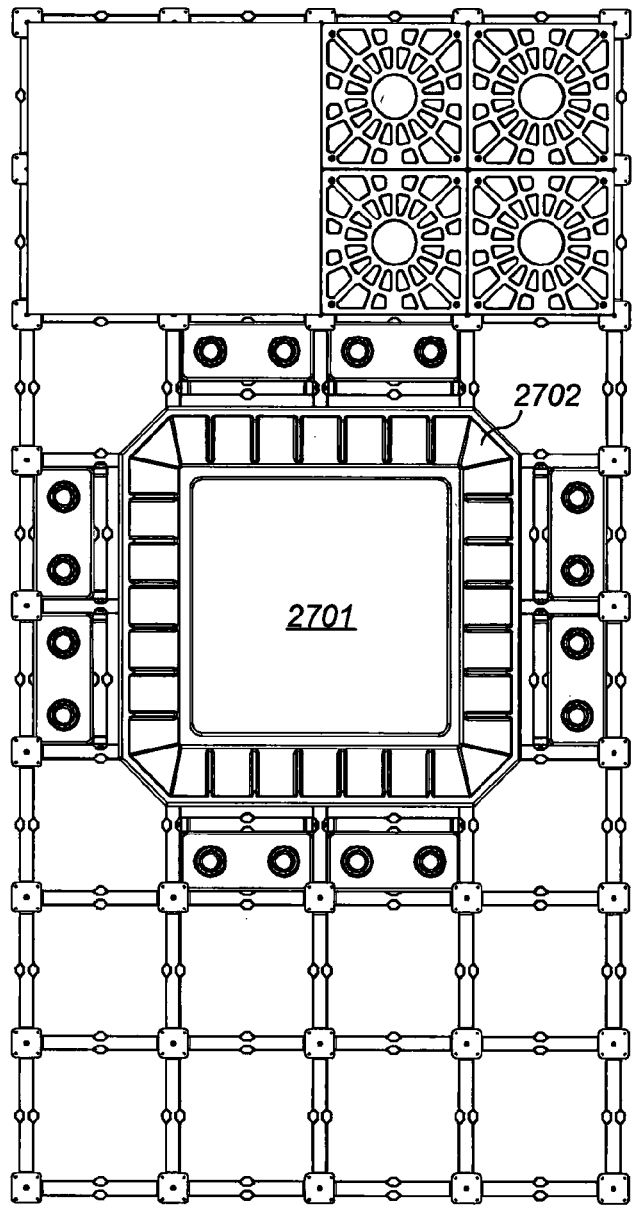
FIG. 27 shows a plan view of a structure constructed from panels according to an embodiment of the invention.
Figure 28:
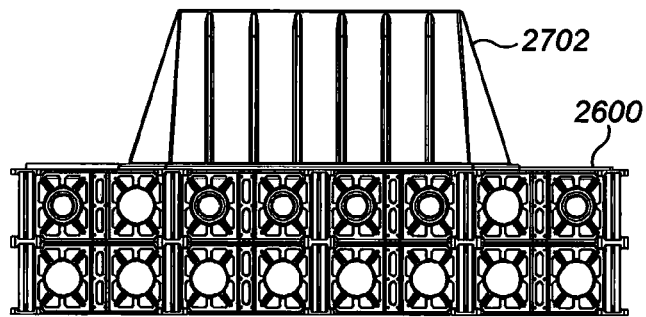
FIG. 28 is a side view of the structure of FIG. 27.

In use, a structure such as that shown in FIG. 27 would typically be placed into a pit dug out of the ground in which a tree or trees are to be planted. The structure would be assembled and filled with soil. A tree or trees would then be planted. The structure would then support surface structures such as road surfaces. FIG. 27 shows a plan view of a structure constructed from panels according to an embodiment of the invention. In addition to the panels, capping tiles and water storage units previously shown, there is illustrated a tree planting area 2701, which may comprise a root protector unit 2702. FIG. 28 is a side view of the structure of FIG. 27, illustrating the positioning of the root protector unit 2702. An advantage of the arrangement is that should a utility pipe need to be laid subsequent to planting the tree, section 1101 may be removed, the pipe laid, and section 1101 replaced, without damaging tree roots.

The invention is not limited to the details of the above embodiments. For example, dovetail like protrusions may extend the full length of the panel, or may comprise several protrusions.

The invention claimed is:

1. A modular anti-soil-compaction tree pit structure comprising:
   a matrix of substantially flat, modular panels, said matrix defining a modular anti-soil-compaction tree pit structure for holding soil, each panel comprising;
      two opposing faces surrounded by edges with each of said edges defining a length, a pair of said edges, opposite of one another, each including a pillar extending along said length with said pillar having a protrusion and a recess wherein said protrusion and said recess extends along the entire length of each one of said pair of said edges, and at least one aperture passing through said faces, said at least one aperture being unobstructed allowing soil to freely pass through said at least one aperture, said matrix adapted to support surrounding areas to prevent compaction of soil within said matrix;

wherein said protrusion extends outwardly from said pillar and said recess extends inwardly into said pillar;

wherein said panel includes a removable section located between said edges, said removable section being separable from said main body along joining lines, said joining lines being located adjacent to said at least one aperture and oriented at an oblique angle relative to said pillar and thereby, allowing access to said at least one aperture to place a pipe or similar structure into said aperture without disturbance other portions of said panel;

each panel is connected with at least one adjacent panel without any additional securing mechanism by:
(i) the protrusion of the panel inserted into the recess of an adjacent panel, or
(ii) the recess of the panel receives the protrusion of the adjacent panel.

2. The structure according to claim 1, wherein the modular panels are directly connected to one another in the matrix.

3. The structure according to claim 1, wherein the protrusions and recesses form hermaphrodite connectors.

4. The structure according to claim 1, wherein a base of said modular panel matrix is rectangular.

5. The structure according to claim 1, wherein a base of said modular panel matrix is hexagonal.

6. The structure according to claim 1, wherein individual modular panels are differentiated by colour-coding or integrated text.

7. The structure according to claim 1, further comprising a top-side panel positioned across a top of at least part of the modular panel matrix.

8. The structure according to claim 1, wherein the modular panels are substantially rectangular.

9. The structure according to claim 1, wherein a top section of the modular panel is removable to provide access to the at least one aperture.

10. A modular anti-soil-compaction tree pit structure comprising:
a substantially flat panel having a pair of opposed faces surrounded by at least two pairs of opposed edges, and
at least one aperture passing through said faces, wherein each of at least one pair of opposed edges defining a length, said opposed edges each including a pillar extending along said length and said pillar having a protrusion and a recess with said protrusion and said recess extending along the entire length and insertable with a respective protrusion and a recess on other panels without any additional securing mechanism to create a matrix of interconnecting panels; said matrix defining a modular anti-soil compaction tree pit structure for holding soil, said matrix adapted to support surrounding areas to prevent compaction of soil within said matrix;

wherein said substantially flat panel includes a removable section located between said edges, said removable section being separable from said main body along joining lines, said joining lines being located adjacent to said aperture and oriented at an oblique angle relative to said pillar and thereby, allowing access to said at least one aperture to place a pipe or similar structure into said aperture without disturbance other portions of said substantially flat panel;

wherein said protrusion extends outwardly from said pillar and said recess extends inwardly into said pillar.

11. The structure according to claim 10, wherein said protrusion and recess comprise hermaphrodite connectors.

12. The structure according to claim 10, wherein the connection means provide for a square-based matrix.

13. The structure according to claim 10, wherein the panel is identified by colour coding or integrated text.

14. The structure according to claim 10, further comprising:
a top-side panel adapted to lie across a top of at least part of a modular panel matrix.

15. A kit for constructing a modular anti-soil-compaction tree pit structure comprising:
a plurality of substantially flat, modular panels, each panel comprising;
two opposing faces surrounded by edges with each of said edges defining a length,
a pair of said edges, opposite of one another, each including a pillar extending along said length and said pillar having a protrusion and a recess with said protrusion and said recess extending along the entire length of said at least one of said edges, and
at least one aperture passing through said faces,
wherein said protrusion extends outwardly from said pillar and said recess extends inwardly into said pillar;
wherein said panel includes a removable section located between said edges, said removable section being separable from said main body along joining lines, said joining lines being located adjacent to said aperture and oriented at an oblique angle relative to said pillar and thereby, allowing access to said at least one aperture to place a pipe or similar structure into said aperture without disturbance other portions of said panel;
wherein each panel is connected with at least one adjacent panel without any additional securing mechanism by
the protrusion of the panel inserted into the recess of an adjacent panel, or
(ii) the recess of the panel receiving the protrusion of the adjacent panel;
said panels defining a matrix of substantially flat, modular panels, said matrix defining the modular anti-soil compaction tree pit structure for holding soil, said matrix adapted to support surrounding areas to prevent compaction of soil within said matrix.

16. A kit for constructing a modular anti-soil-compaction tree pit structure, comprising:
a plurality of substantially flat panels having a pair of opposing faces and at least one pair of opposed edges with each of said edges defining a length; and
at least one aperture passing through said faces; wherein said at least one pair of opposed edges includes a connector defined by a pillar having a protrusion and adjacent recess extending along the entire length of said pillar mating with a protrusion and a recess on a corresponding connectors on other panels without any additional securing mechanism for creating a matrix of interconnecting panels, said matrix defining the modular anti-soil compaction tree pit structure for holding soil, said matrix adapted to support surrounding areas to prevent compaction of soil within said matrix;

wherein each panel of said plurality of substantially panels includes a removable section located between said edges, said removable section being separable from said main body along joining lines, said joining lines being located adjacent to said aperture and oriented at an oblique angle relative to said pillar and thereby, allowing access to said at least one aperture to place a pipe or similar structure into said aperture without disturbance other portions of said panel;

wherein said protrusion extends outwardly from said pillar and said adjacent recess extends inwardly into said pillar.

\* \* \* \* \*